(12) United States Patent
Sharda et al.

(10) Patent No.: US 11,364,905 B2
(45) Date of Patent: Jun. 21, 2022

(54) SCRAPE DETECTION FOR MOTOR VEHICLE

(71) Applicant: Dr. Ing. h.c. F. Porsche Aktiengesellschaft, Stuttgart (DE)

(72) Inventors: Aryaman Sharda, San Francisco, CA (US); Henry Chen, Atherton, CA (US)

(73) Assignee: Dr. Ing. h.c. F. Porsche Aktiengesellschaft

( * ) Notice: Subject to any disclaimer, the term of this patent is extended or adjusted under 35 U.S.C. 154(b) by 228 days.

(21) Appl. No.: 16/413,824

(22) Filed: May 16, 2019

(65) Prior Publication Data

US 2020/0361457 A1 Nov. 19, 2020

(51) Int. Cl.
| | |
|---|---|
| *B60W 30/095* | (2012.01) |
| *G05D 1/02* | (2020.01) |
| *B60W 40/076* | (2012.01) |
| *B60W 50/14* | (2020.01) |
| *B60W 50/00* | (2006.01) |
| *G05D 1/00* | (2006.01) |

(52) U.S. Cl.
CPC ...... *B60W 30/0956* (2013.01); *B60W 40/076* (2013.01); *B60W 50/0097* (2013.01); *B60W 50/14* (2013.01); *G05D 1/0088* (2013.01); *G05D 1/0214* (2013.01); *G05D 1/0278* (2013.01); *B60W 2050/0075* (2013.01); *B60W 2556/50* (2020.02)

(58) Field of Classification Search
CPC ........... B60W 30/0956; B60W 40/076; B60W 50/0097; B60W 50/14; B60W 2050/0078; B60W 30/095; G05D 1/0088; G05D 1/0214; G05D 1/0278

USPC .......................................................... 701/301
See application file for complete search history.

(56) References Cited

U.S. PATENT DOCUMENTS

| | | | |
|---|---|---|---|
| 4,143,370 A | 3/1979 | Yamanaka et al. | |
| 8,676,431 B1* | 3/2014 | Mariet | G08G 1/0962 |
| | | | 701/28 |
| 10,163,349 B1* | 12/2018 | Desai | B60R 16/03 |
| 2008/0277951 A1* | 11/2008 | Rathje | B60R 21/34 |
| | | | 293/115 |

(Continued)

FOREIGN PATENT DOCUMENTS

| | | | |
|---|---|---|---|
| CN | 108032803 | * | 5/2018 |
| GB | 2546859 B | | 3/2018 |

(Continued)

OTHER PUBLICATIONS

Kurt Heckman, Approach (departure) angle, Jan. 2, 2015 (Year: 2015).*

*Primary Examiner* — Elaine Gort
*Assistant Examiner* — Matthias S Weisfeld
(74) *Attorney, Agent, or Firm* — RatnerPrestia

(57) ABSTRACT

A method and control system for assessing a potential for collision between a body part of a vehicle and a roadway. The method includes predicting a trajectory path of the vehicle along the roadway, monitoring elevations of the roadway along the trajectory path, and analyzing, at a point along the trajectory path of the roadway, whether the body part of the vehicle will collide with the roadway based upon the estimated elevation of the body part on the vehicle at the point along the trajectory path and the estimated elevation of the roadway at the point along the trajectory path.

22 Claims, 2 Drawing Sheets

(56) References Cited

U.S. PATENT DOCUMENTS

| | | | |
|---|---|---|---|
| 2011/0169663 A1 | 7/2011 | Stählin et al. | |
| 2014/0303844 A1* | 10/2014 | Hoffmann | B60G 17/08 |
| | | | 701/37 |
| 2017/0138752 A1* | 5/2017 | Mermelstein | G01C 21/3484 |
| 2017/0285646 A1* | 10/2017 | Connor | G05D 1/0214 |
| 2017/0341641 A1 | 11/2017 | Miller et al. | |
| 2018/0096601 A1* | 4/2018 | Chow | H04W 84/00 |
| 2019/0079539 A1* | 3/2019 | Sridhar | G05D 1/0278 |
| 2020/0139784 A1* | 5/2020 | Sridhar | B60G 21/08 |
| 2020/0231016 A1* | 7/2020 | Vente | B60G 17/0165 |

FOREIGN PATENT DOCUMENTS

| | | |
|---|---|---|
| JP | 3052725 U | 10/1998 |
| WO | 2017124551 A1 | 7/2017 |

\* cited by examiner

SCRAPE DETECTION FOR MOTOR VEHICLE

FIELD OF THE INVENTION

The present invention relates generally to a motor vehicle system for detecting an imminent scrape or collision with a roadway.

BACKGROUND OF THE INVENTION

For motor vehicles having bumpers that are close to the ground, it is common to experience inadvertent scraping of the front and/or rear bumpers upon encountering pavement dips, high curbs, potholes or other obstacles. It would be advantageous to warn a driver prior to encountering the obstacle in order to avoid costly destruction of the vehicle.

SUMMARY OF THE INVENTION

According to one aspect of the invention, a method for assessing a potential for collision between a body part of a vehicle and a roadway comprises predicting a trajectory path of the vehicle along the roadway; monitoring elevations of the roadway along the trajectory path; and analyzing, at a point along the trajectory path of the roadway, whether the body part of the vehicle will collide with the roadway based upon the estimated elevation of the body part on the vehicle at the point along the trajectory path and the estimated elevation of the roadway at the point along the trajectory path.

According to another aspect of the invention, a vehicle comprises a control system configured to: predict a trajectory path of the vehicle along a roadway; monitor elevations of the roadway along the trajectory path; and analyze, at a point along the trajectory path of the roadway, whether a body part of the vehicle will collide with the roadway based upon the estimated elevation of the body part on the vehicle at the point along the trajectory path and the estimated elevation of the roadway at the point along the trajectory path.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

DETAILED DESCRIPTION OF THE INVENTION

Figure 1:
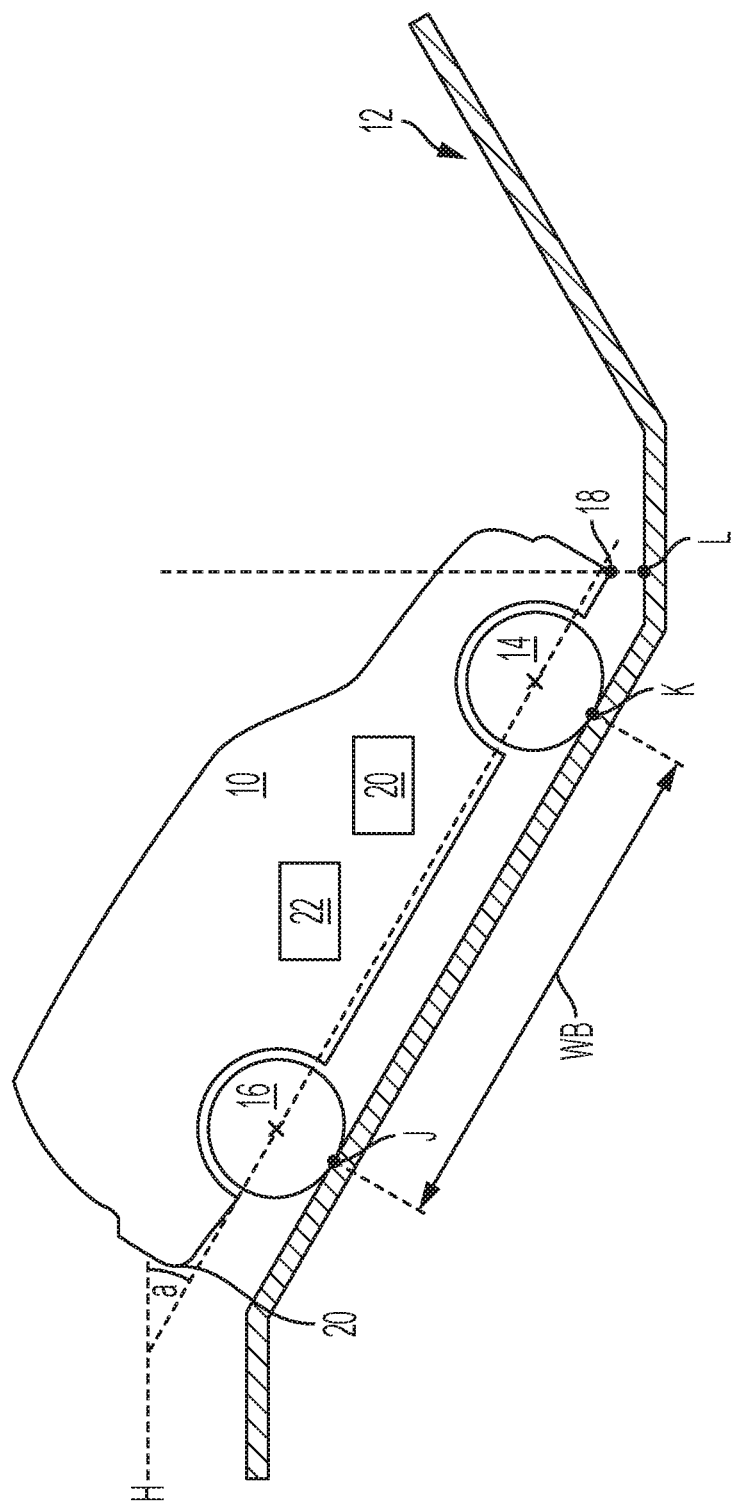
FIG. 1 is a schematic view of a vehicle moving along a roadway.

Corresponding reference characters indicate corresponding parts throughout the several views. The exemplification set out herein illustrates an embodiment of the invention, in one form, and such exemplification is not to be construed as limiting the scope of the invention in any manner.

The terms "front," "forward," "rear" and "reverse," when used in connection with the vehicle are usually determined with reference to the direction of forward operative travel of the vehicle, but, they should not be construed as limiting.

Referring now to the drawings, FIG. 1 is a schematic view of a vehicle 10 moving along a roadway 12, The vehicle 10 is a conventional vehicle having front wheels 14, rear wheels 16, a front bumper 18 and a rear bumper 20. Reference character 18 designates the lowermost forward point on the body of the vehicle, while reference character 20 designates the lowermost rearward point on the body of the vehicle.

In use, the vehicle 10 travels along the roadway 12 at vehicle approach angle 'a,' which is measured relative to a horizontal axis 'H.' To compute the anticipated vehicle approach angle 'a' of the vehicle, it is necessary to understand (i) the predicted vehicle trajectory, and (ii) the elevation of the roadway along the predicted vehicle trajectory.

The vehicle trajectory can be accurately predicted by a control unit 20 of the vehicle based upon (i) a route entered by a user into the GPS system 22, or (ii) a predicted route, which is a route predicted as a function of (a) the vehicle's current trajectory based upon the wheel angle input, (b) the velocity of the vehicle, (c) the current GPS location, and (d) the established roadways in the GPS system.

The anticipated vehicle approach angle along the predicted vehicle trajectory can be accurately predicted using a 3D map system, such as the Google Elevation API. The Google Elevation API is a database that provides elevation data for all locations on the surface of the earth, and is currently available to the public. The Elevation API may be accessed, for example, through an HTTP interface, with requests constructed as a URL string, using latitude/longitude coordinates to identify the locations or path vertices.

The latitude/longitude coordinates along the predicted vehicle trajectory can be provided to a control system 20 of the vehicle by the vehicle's GPS system 22 based upon (i) said route entered into the GPS system 22 by a user, or (ii) said predicted route, as described above. The control system 20 of the vehicle then provides those latitude/longitude coordinates to the 3D map system (such as Google Elevation API), and the 3D map system outputs an elevation value for each latitude/longitude coordinate along the predicted vehicle trajectory. Thus, the control system 20 possesses the elevation points along the predicted vehicle trajectory.

The vehicle approach angle 'a' can be predicted at a specific point along the predicted vehicle trajectory by calculating the slope of the roadway 12 at that particular point along the predicted vehicle trajectory. The vehicle approach angle 'a' of the vehicle at a particular point along the predicted vehicle trajectory is based upon the elevations of points J and K. Point J represents the point of contact between the front tire and the roadway 12, whereas point K represents the point of contact between the rear tire and the roadway 12. The distance between points J and K, which is the wheelbase 'WB' of the vehicle, is a known quantity set by the vehicle manufacturer.

To calculate the vehicle approach angle a, the control system 20 first determines the elevation at point J using the known latitude/longitude coordinates at point J along the predicted vehicle trajectory, as described above using the 3D map system. Specifically, the GPS system 22 of the control system 20 provides the latitude/longitude coordinates at point J to the 3D map system. The 3D map system then outputs the elevation at point J to the control system 20. The GPS system 22 of the control system 20 then provides the latitude/longitude coordinates at point K to the 3D map system. The 3D map system then outputs the elevation at point K to the control system 20. The vehicle approach angle a is then calculated by the control system 20 using the following equation:

Vehicle approach angle 'a'=sin⁻¹((Elevation at point
K–Elevation at point J)/WB)

In other words, the vehicle approach angle 'a' is equal to the inverse sin of the difference between the elevation at points J and K divided by the wheelbase WB. The vehicle approach angle 'a' may then be converted from radians to degrees, if so desired. It should be understood that other ways exist for calculating the vehicle approach angle 'a' at a particular point along the predicted vehicle trajectory, and the invention is not necessarily limited to the calculations described above.

Figure 2:
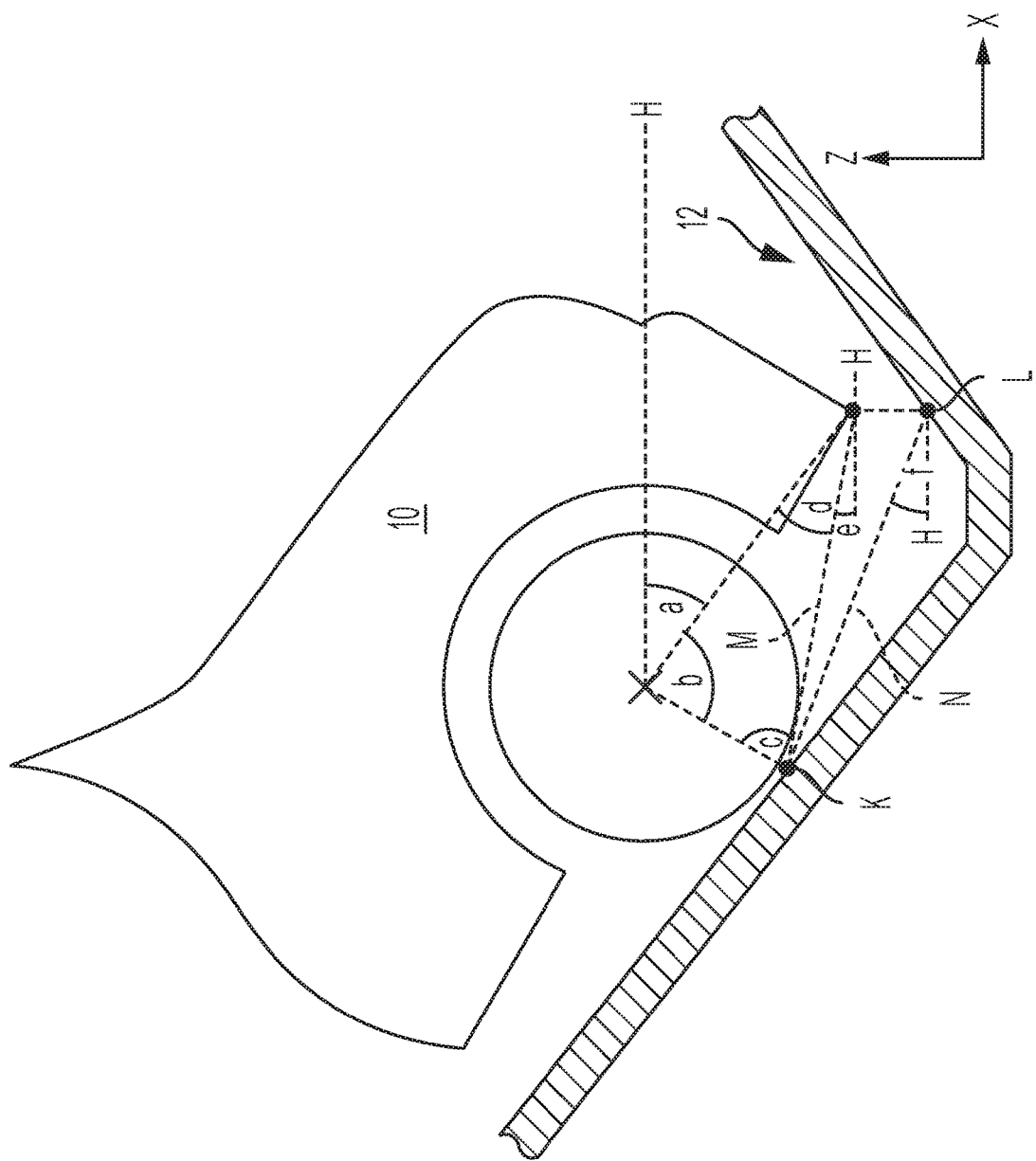
FIG. 2 is a detailed schematic view of the vehicle of FIG. 1.

Turning now to FIGS. 1 and 2, it is noted that items H in FIG. 2 each represent a horizontal axis. Now that the vehicle approach angle 'a' has been calculated at a specific point along the predicted vehicle trajectory, it is necessary to consider whether the bumper 18 will collide with or scrape the roadway at that specific point along the predicted vehicle trajectory. More particularly, when the tires are located at positions J and K, the lowermost forward point 18 of the front bumper will be located at or above an elevation corresponding to point L on the roadway 12. Point L is located at the same latitude/longitude coordinates as point 18. The latitude/longitude coordinates of position L are known values because the distance M from point K to point 18 is a quantity set by the vehicle manufacturer. The control system 20 provides the latitude/longitude coordinates at point L, which are based upon the coordinates at point K and the known distance M, to the 3D map system. The 3D map system then outputs the elevation of the roadway 12 at point L to the control system 20.

The control system 20 then calculates the road slope angle 'f' of the imaginary road slope line N extending between point K and point L using the following formula:

Road slope angle 'f'=sin⁻¹((Elevation at point L
Elevation at point K)/Distance N).

In other words, the road slope angle 'f' is equal to the inverse sin of the difference between the elevation at points L and K divided by the distance N. It is noted that the distance N between points K and L is calculated by the control system 20 based upon the known latitude/longitude and elevation coordinates at points K and L. Specifically, distance N may be calculated using the following equation:

$$N=\sqrt{((X_L-X_K)^2+(Z_L-Z_K)^2)}$$

The quantity $X_L$, for example, is the location of point L along the X-axis. The road slope angle f may then be converted from radians to degrees, if so desired. It should be understood that other ways exist for calculating the road slope angle at a particular point along the predicted vehicle trajectory, and the invention is not necessarily limited to the calculations described above.

The control system 20 then calculates the bumper approach angle 'e' of the vehicle at the specific point along the predicted vehicle trajectory using the following formula:

Bumper approach angle e=Vehicle approach angle
a–Bumper angle d

Bumper angle d is a known quantity set by the vehicle manufacturer. The slope of the imaginary line M extending between point K and point 18 on the front bumper is also known quantity set by the vehicle manufacturer, and is based upon angles b, c, and to d, which are also known quantities set by the vehicle manufacturer. It should be understood that angles c, d and e could vary based upon tire pressure, body roll and/or the compression state of the vehicle suspension system. The tire pressure, body roll and the compression state of the vehicle suspension system may be monitored by the vehicle during use, and the control system 20 may account for changes in these and other variables while performing the appropriate calculations.

It should be understood that other ways exist for calculating the bumper approach angle 'e' at a particular point along the predicted vehicle trajectory, and the invention is not necessarily limited to the calculations described above.

The control system 20 then compares the bumper approach angle 'e' with the road slope angle 'f.' Stated differently, the control system 20 indirectly compares an anticipated elevational position on the bumper 18 with an anticipated elevational position of point L on the trajectory path of the roadway 12, which share the same latitude and longitude coordinates. The control system 20 may account for a safety factor of 10% in that comparison, for example.

If the bumper approach angle 'e' is less than the road slope angle 'f', then there is no danger of the bumper 18 colliding with the roadway 12 at point L. Conversely, if the bumper approach angle 'e' is greater than the road slope angle 'f', then there is a danger of the bumper 18 colliding with the roadway 12 at point L, and, consequently, scraping the bumper at point 18. When the control system 20 identifies the potential collision, the control system 20 will display a warning to the driver (visually, audibly and/or haptically) that there is a danger of collision. Accordingly, the driver can stop the vehicle before reaching said point along the predicted vehicle trajectory, and thereby avoid a collision or a bumper scrape. The control system 20 may visually communicate to the driver a location of the anticipated collision on the GPS system 22 of the vehicle. In response, the GPS system 22 may suggest a different route for avoiding the collision.

The control system 20 may record the location of the potential collision in a database of the vehicle for future reference. The control system 20 may also be configured to share the location of the potential collision with other similar vehicles, or provide the location of the potential collision to an external remote application such as Waze, Google Maps, or a website, for example, along with the make, model and year of the vehicle 10. Data may be shared between the vehicle and the remote application wirelessly by a transmitter/receiver in the vehicle.

The control system 20 continuously performs the above analysis as the vehicle travels along the roadway 12. More particularly, as the vehicle travels along the roadway, the control system 20 continuously monitors the elevations at points J, K and L using the 3D maps to evaluate the risk of colliding with the roadway. The control system 20 may monitor points J, K and L along the predicted vehicle trajectory that are as little as 1 meter (or less) from the bumper, or as much as 1 kilometer from the bumper. By way of example, control system 20 may monitor points along the predicted vehicle trajectory that are at least ten meters downstream (e.g., forward) of the vehicle and along the predicted vehicle trajectory. It is noted that this analysis is performed without the benefit of optical (or other) sensors that sense the distance between the roadway and a point on the vehicle.

It is also noted that the above-described analysis is not limited to the front bumper, and can be performed to warn of collisions with the rear bumper while the vehicle is being operated in the forward direction. Also, the above-described analysis can be performed to warn of collisions with the rear bumper while the vehicle is being operated in a reverse direction.

It is to be understood that the automated operational steps are performed by the controller of the control system 20 in the vehicle upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller described herein is implemented in software code or instructions which are tangibly stored on a tangible computer readable medium. Upon loading and executing such software code or instructions by the controller, the controller may perform any of the functionality of the controller described herein, including any steps of the methods described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

It should be apparent that, within the principles and scope of the invention, many changes are possible and contemplated. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A method for assessing a potential for collision between a bumper of a vehicle and an incline of a roadway, said method comprising:
   predicting or receiving a trajectory path of the vehicle along the roadway;
   monitoring elevations of the roadway along the trajectory path by accessing elevational data for the roadway from 3D map software;
   estimating the elevation of the bumper along the trajectory path without using physical proximity sensors;
   estimating the elevation of the roadway along the trajectory path without using physical proximity sensors;
   analyzing, at multiple points along the trajectory path of the roadway, a vertical distance separating the bumper of the vehicle from the roadway, wherein for each point along trajectory path of the roadway, the analysis is based upon the estimated elevation of the bumper on the vehicle at that point and the estimated elevation of the inclined roadway at that point; and
   prior to the vehicle reaching the inclined roadway, warning a driver of the vehicle of an anticipated collision between the incline of the roadway and the bumper based upon the analyzing step, wherein the vehicle is not configured to adjust a suspension setting of the vehicle in response to the anticipated collision.

2. The method of claim 1, further comprising the steps of identifying an alternative route that avoids the anticipated collision and displaying the alternative route to the driver.

3. The method of claim 1, wherein the monitoring step comprises accessing elevational data from 3D map software based upon latitude and longitude coordinates at said point along the trajectory path.

4. The method of claim 1, wherein the point along the trajectory path is at least ten meters ahead of an actual position of the vehicle along the trajectory path.

5. The method of claim 1, wherein a lowermost forward point on the vehicle is defined on the bumper.

6. The method of claim 1, wherein the analyzing step comprises comparing (i) a slope of a first imaginary line extending between a tire of the vehicle and the bumper at the point along the trajectory path with (ii) a slope of a second imaginary line extending between the tire and the point along the trajectory path.

7. The method of claim 6, wherein if the slope of the first imaginary line, which corresponds to a bumper approach angle, is less than the slope of the second imaginary line, which corresponds to a road slope angle, then there exists no danger of a collision, and
   wherein if the slope of the first imaginary line is greater than the slope of the second imaginary line then there exists a collision danger.

8. The method of claim 1, wherein the estimated elevation of the bumper on the vehicle at the point along the trajectory path and the estimated elevation of the roadway at the point along the trajectory path share the same latitude and longitude coordinates.

9. The method of claim 1, wherein the step of estimating the elevation of the bumper along the trajectory path comprises estimating the elevation of the bumper along the entire trajectory path.

10. The method of claim 1 further comprising communicating said point on the trajectory path of the roadway to the driver using a GPS system of the vehicle.

11. The method of claim 1 further comprising communicating the anticipated collision to a remote application.

12. The method of claim 11, wherein the remote application is a traffic application.

13. The method of claim 1, wherein the step of estimating the elevation of the bumper accounts for tire pressure.

14. The method of claim 1, wherein the step of estimating the elevation of the bumper accounts for tire pressure, body roll and a compression state of the vehicle suspension system.

15. A vehicle comprising a control system configured to:
   predict or receive a trajectory path of the vehicle along a roadway;
   monitor elevations of the roadway along the trajectory path by accessing elevational data for the roadway from 3D map software;
   estimate the elevation of a bumper of the vehicle along the trajectory path without using physical proximity sensors;
   estimate the elevation of the roadway along the trajectory path without using physical proximity sensors;
   analyze, at multiple points along the trajectory path of the roadway, a vertical distance separating the bumper of the vehicle from the roadway, wherein for each point along the trajectory path of the roadway, the analysis is based upon the estimated elevation of the bumper on the vehicle at that point and the estimated elevation of the incline of the roadway at that point; and warn a driver of the vehicle of an anticipated collision between the inclined roadway and the bumper prior to the vehicle reaching the inclined roadway, wherein the vehicle is not configured to adjust a suspension setting of the vehicle in response to the anticipated collision.

16. The vehicle of claim 15, wherein for the analyzing step, the control system is configured to compare (i) a slope of a first imaginary line extending between a tire of the vehicle and the bumper at the point along the trajectory path with (ii) a slope of a second imaginary line extending between the tire and the point along the trajectory path.

17. The vehicle of claim 16, wherein if the slope of the first imaginary line, which corresponds to a bumper approach angle, is less than the slope of the second imaginary line, which corresponds to a road slope angle, then there exists no danger of a collision, and wherein if the slope of the first imaginary line is greater than the slope of the second imaginary line then there exists a collision danger.

18. The vehicle of claim 15, wherein the control system is further configured to identify an alternative route that avoids the anticipated collision and display the alternative route to the driver.

19. The vehicle of claim 15, wherein the control system is configured to communicate said point on the trajectory path of the roadway to the driver using a GPS system of the vehicle.

20. The vehicle of claim 15, wherein the monitoring step comprises accessing elevational data for the roadway from 3D map software based upon latitude and longitude coordinates at said point along the trajectory path.

21. The method of claim 9, wherein the step of analyzing comprises analyzing whether the bumper of the vehicle will collide with the incline of the roadway based upon the estimated elevation of the bumper on the vehicle and the estimated elevation of the inclined roadway along the entire trajectory path of the roadway.

22. The vehicle of claim 15, wherein the step of estimating the elevation of the bumper accounts for tire pressure.

* * * * *